(12) United States Patent
Passantino et al.

(10) Patent No.: US 12,499,459 B2
(45) Date of Patent: Dec. 16, 2025

(54) SYSTEM AND METHOD FOR REAL-TIME CUSTOMER SEGMENT-BASED PERSONALIZATION INCLUDING DYNAMIC SEGMENT SWITCHING

(71) Applicant: BloomReach, Inc., Mountain View, CA (US)

(72) Inventors: Frank Passantino, Mountain View, CA (US); Paul Edwards, Mountain View, CA (US); Ate Douma, Mountain View, CA (US); Shekhar Kumar, Mountain View, CA (US)

(73) Assignee: BloomReach, Inc., Mountain View, CA (US)

( * ) Notice: Subject to any disclaimer, the term of this patent is extended or adjusted under 35 U.S.C. 154(b) by 288 days.

(21) Appl. No.: 18/100,922

(22) Filed: Jan. 24, 2023

(65) Prior Publication Data

US 2024/0249303 A1 Jul. 25, 2024

(51) Int. Cl.
G06Q 30/02 (2023.01)
G06Q 30/0204 (2023.01)
G06Q 30/0601 (2023.01)

(52) U.S. Cl.
CPC ..... G06Q 30/0204 (2013.01); G06Q 30/0631 (2013.01)

(58) Field of Classification Search
CPC .................................................... G06Q 30/02
See application file for complete search history.

(56) References Cited

U.S. PATENT DOCUMENTS 11,488,223 B1* 11/2022 Suprasadachandran Pillai ........... G06Q 30/0282
2007/0150465 A1 6/2007 Brave et al.
2007/0233671 A1 10/2007 Oztekin et al.
(Continued)

FOREIGN PATENT DOCUMENTS

CA 3125015 A1 * 1/2014 ....... G06F 16/24573

OTHER PUBLICATIONS

Chandra et al., Personalization in personalized marketing: Trends and ways forward, Psychology & Marketing published by Wiley Periodicals LLC, Psychol Mar. 2022;39:1529-1562, Sep. 22, 2021. (Year: 2021).*

(Continued)

*Primary Examiner* — Kurtis Gills
(74) *Attorney, Agent, or Firm* — MOSER TABOADA

(57) ABSTRACT

Methods and apparatuses for customer engagement include: receiving a first product search query from a visitor identified in a visitor session, wherein the first product search query includes at least a visitor identifier associated with customer segments; returning first product search results based on the first product search query; updating, after the first product search query, the customer segments associated with the visitor identifier based on real time evaluation of visitor characteristics and/or actions; receiving a second product search query that is the same as the first product search query from the visitor, wherein the second product search query includes at least the visitor identifier associated with the updated customer segments; and returning second product search results based on the second product search query that is different from the first product search results.

14 Claims, 4 Drawing Sheets

(56) References Cited

U.S. PATENT DOCUMENTS

| | | | |
|---|---|---|---|
| 2009/0171813 A1* | 7/2009 | Byrne | G06Q 30/0623 |
| | | | 707/999.005 |
| 2012/0089598 A1 | 4/2012 | Oztekin | |
| 2012/0233035 A1* | 9/2012 | Wilgus | G06Q 30/02 |
| | | | 705/27.1 |
| 2014/0122228 A1* | 5/2014 | Wical | G06Q 30/02 |
| | | | 705/14.53 |
| 2019/0205939 A1 | 7/2019 | Lal et al. | |
| 2020/0134635 A1* | 4/2020 | Podgorny | G06F 16/248 |
| 2022/0148060 A1 | 5/2022 | McGinnis et al. | |
| 2024/0104622 A1* | 3/2024 | Gudla | G06Q 30/0629 |
| 2024/0386403 A1* | 11/2024 | Fortiscue | G06Q 20/387 |

OTHER PUBLICATIONS

International Search Report & Written Opinion for Application No. PCT/US2024/010828 mailed Mar. 20, 2024, 13 pages.

* cited by examiner

SYSTEM AND METHOD FOR REAL-TIME CUSTOMER SEGMENT-BASED PERSONALIZATION INCLUDING DYNAMIC SEGMENT SWITCHING

BACKGROUND

Field of the Invention

Embodiments of the present invention generally relate to systems and methods of customer engagement.

Description of the Related Art

Web sites (e.g., web applications and/or various other web services delivered through web sites) generally store and display content (e.g., products or services related content in the case of a retailer, such as an e-commerce site; various informational related content in the case of a publisher, such as an online news or online magazine site; and/or various other content for other types of merchant sites). For example, this content can be accessed by a user with an internal site search approach, where a user inputs specific search terms into a search bar.

For multiple users who use an internal site search approach, the same search terms will result in the same search results, since the search will be based only on the input search terms. Thus, the search results are not personalized based on the interests or needs of the users. As a result, each user must provide more detailed search criteria specific to their interests or sort through generic search results to meet their specific needs.

Thus, there is a need in the art for methods, system, and apparatus which can facilitate both large-scale tracking of consumer behavior and preferences that allow for personalized customer search.

SUMMARY

According to some embodiments, a customer engagement method includes receiving a first product search query from a visitor identified in a visitor session, wherein the first product search query includes at least a visitor identifier associated with customer segments; returning first product search results based on the first product search query; updating, after the first product search query, the customer segments associated with the visitor identifier based on real time evaluation of visitor characteristics and/or actions; receiving a second product search query that is the same as the first product search query from the visitor, wherein the second product search query includes at least the visitor identifier associated with the updated customer segments; and returning second product search results based on the second product search query that is different from the first product search results.

According to some embodiments, a system for customer engagement includes a processor configured to: receive a first product search query from a visitor identified in a visitor session, wherein the first product search query includes at least a visitor identifier associated with customer segments; return first product search results based on the first product search query; update, after the first product search query, the customer segments associated with the visitor identifier based on real time evaluation of visitor characteristics and/or actions; receive a second product search query that is the same as the first product search query from the visitor, wherein the second product search query includes at least the visitor identifier associated with the updated customer segments; and return second product search results based on the second product search query that is different from the first product search results.

According to some embodiments, a non-transitory computer readable medium, storing thereon computer readable instructions that when read by a computer cause a processor to perform a customer engagement method comprising: receiving a first product search query from a visitor identified in a visitor session, wherein the first product search query includes at least a visitor identifier associated with customer segments; returning first product search results based on the first product search query; updating, after the first product search query, the customer segments associated with the visitor identifier based on real time evaluation of visitor characteristics and/or actions; receiving a second product search query that is the same as the first product search query from the visitor, wherein the second product search query includes at least the visitor identifier associated with the updated customer segments; and returning second product search results based on the second product search query that is different from the first product search results.

Various advantages, aspects and features of the present disclosure, as well as details of an illustrated embodiment thereof, are more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
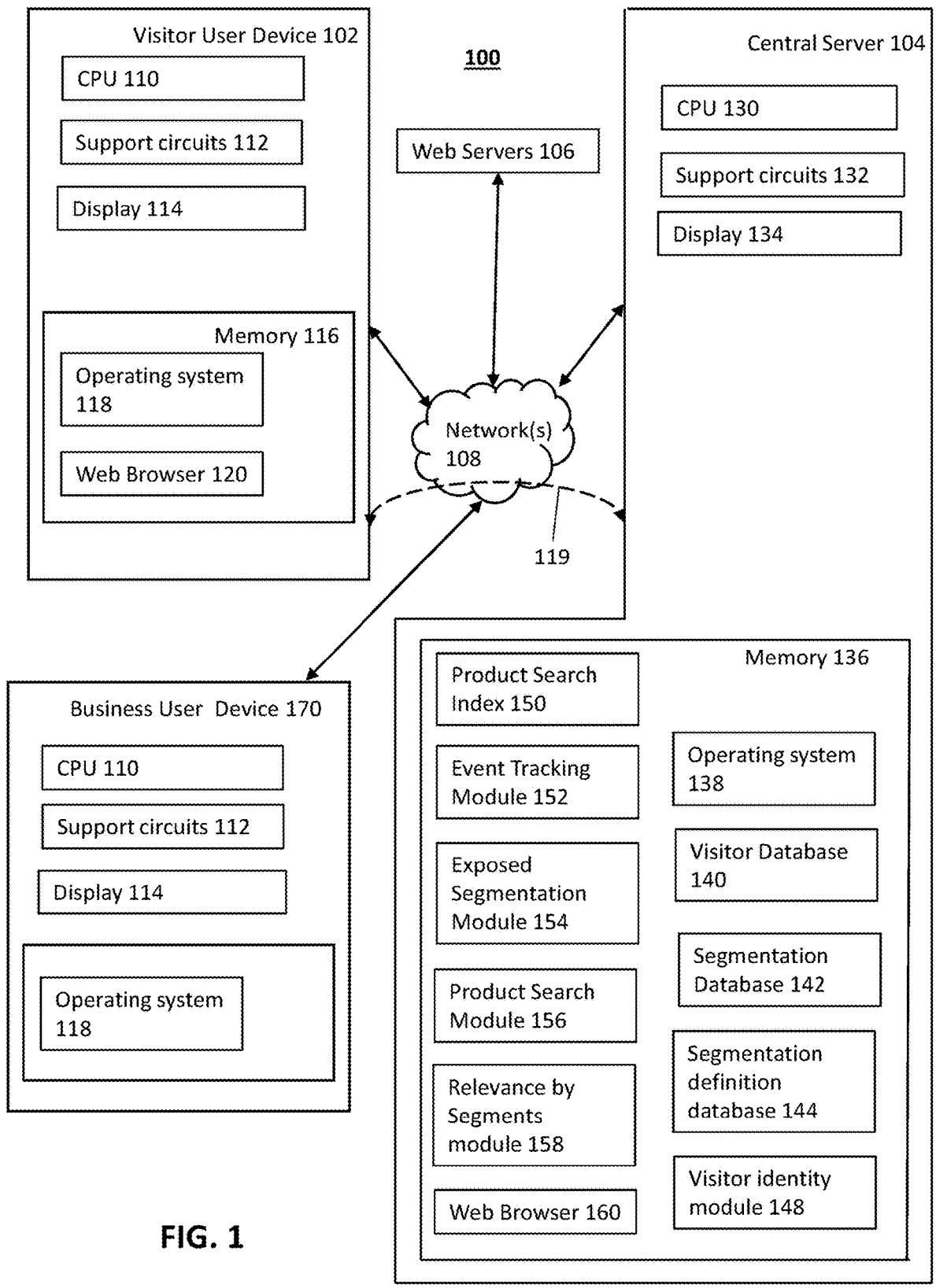
FIG. 1 depicts a high-level block diagram of an embodiment of a network architecture of a system for customer engagement in accordance with the present principles.

The following detailed description describes techniques (e.g., methods, processes, and systems) for customer engagement. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims.

Embodiments consistent with the disclosure use a solution that works with customer queries from the Internet, which can include product or service search terms. Product or service search terms may include keywords or natural language search words that a customer may use to search for a product or service on a commercial website (i.e., an e-commerce platform).

Systems and methods in accordance with this disclosure can receive a first product search query from an identified visitor (e.g. a customer) associated with customer segments, return first product search results based on the first product search query, update (after the first product search query) the customer segments associated with the visitor identifier based on real time evaluation of visitor characteristics and/or actions, receive a second product search query that is the same as the first product search query from the visitor, wherein the second product search query includes at least the visitor identifier associated with the updated customer segments, and return second product search results based on the second product search query that is different than the first product search results. Thus, the systems and methods in accordance with this disclosure can use customer behavior and preferences to provide personalized customer search results, which may be more relevant to the customer and may lead to higher conversion rates for the business.

FIG. 1 depicts a block diagram of a system for customer engagement 100 in accordance with at least one embodiment of the disclosure. The system 100 includes a plurality of visitor user devices 102 (one is shown in FIG. 1), a centralized server 104, a business user device 170, and a plurality of web servers 106 (one is shown in FIG. 1) communicatively coupled via one or more networks 108. In embodiments, the centralized server 104 is configured to communicate with the visitor user devices 102 and business user device 170 via networks 108 as discussed in greater detail below.

The networks 108 comprise one or more communication systems that connect computers by wire, cable, fiber optic, and/or wireless link facilitated by various types of well-known network elements, such as hubs, switches, routers, and the like. The networks 108 may include an Internet Protocol (IP) network, a public switched telephone network (PSTN), or other mobile communication networks, and may employ various well-known protocols to communicate information amongst the network resources.

The end-user device or edge device (also referred throughout as "user device") 102 comprises a Central Processing Unit (CPU) 110, support circuits 112, display device 114, and memory 116. The CPU 110 may comprise one or more commercially available microprocessors or microcontrollers that facilitate data processing and storage. The various support circuits 112 facilitate the operation of the CPU 110 and include one or more clock circuits, power supplies, cache, input/output circuits, and the like. The memory 116 comprises at least one of Read Only Memory (ROM), Random Access Memory (RAM), disk drive storage, optical storage, removable storage and/or the like. In some embodiments, the memory 116 comprises an operating system 118, and a web browser 120. The memory 116 may also include a transparent file verification module 124.

The operating system (OS) 118 generally manages various computer resources (e.g., network resources, file processors, and/or the like). The operating system 118 is configured to execute operations on one or more hardware and/or software modules, such as Network Interface Cards (NICs), hard disks, virtualization layers, firewalls and/or the like. Examples of the operating system 118 may include, but are not limited to, various versions of LINUX, MAC OSX, BSD, UNIX, MICROSOFT WINDOWS, IOS, ANDROID and the like.

The web browser 120 is a well known application for accessing and displaying web page content. Such browsers include, but are not limited to, Safari®, Chrome®, Explorer®, Firefox®, etc. Visitor identification information, search queries, and other user input may be input to visitor user devices 102 using the web browser 120. The visitor user device 102 may send such visitor identification information, search queries, and other user input to the central server 104 to track user behavior and train a machine learning algorithm of the relevance by segments (RBS) module 158. This may be performed by multiple visitor user devices 102 continuously as the users (e.g., visitors) interact with the visitor user devices.

In some embodiments, and as shown in FIG. 1, the centralized server 104 may comprise a Central Processing Unit (CPU) 130, support circuits 132, a display device 134, and memory 136. The CPU 130 may comprise one or more commercially available microprocessors or microcontrollers that facilitate data processing and storage. The various support circuits 132 facilitate the operation of the CPU 130 and include one or more clock circuits, power supplies, cache, input/output circuits, and the like. The memory 136 comprises at least one of Read Only Memory (ROM), Random Access Memory (RAM), disk drive storage, optical storage, removable storage and/or the like. In some embodiments, the memory 136 comprises an operating system 138. In some embodiments, the memory 136 includes a visitor database 140, a segmentation database 142, a segmentation definition database 144, a visitor identity module 148, a product search index 150, an event tracking module 152, an exposed segmentations module 154, a product search module 156, and a relevance by segments (RBS) module 158. Also, in some embodiments, and as shown in FIG. 1, the memory 136 may include a web browser 160.

The visitor database 140 contains the static characteristics and collected data and events for all uniquely identified visitors (e.g., customers). Each visitor may be uniquely identified with an identifier, which may be a visitor name or identification number, for example. Also, the visitor database 140 includes all dynamically derived customer segments to which each visitor belongs. As discussed in greater detail below, every change to or newly collected data and events for a visitor can result (e.g., immediately) in a change to which segment(s) the visitor belongs (segment switching) through dynamic re-evaluation of the segmentation rules.

The segmentation database 142 stores segmentations defined by a business user, who may operate an e-commerce website or dedicated application that is accessible to a visitor using the visitor user device 102. The business user may manage the segmentation database 142 using the business user device 170, which is communicatively coupled to the central server 104 via the networks 108. In some embodiments, the business user device 170 may be configured as a computer system 300 shown in FIG. 3 and described in greater detail below. The segmentations stored in the segmentation database 142 may include sets of rules for grouping visitors into customer segments based on real time evaluation of specific visitor characteristics, tracked data, events, and behavioral patterns. For example, a segmentation named "cart value" can group visitors into two groups: a "budget" segment for visitors who's aggregated shopping cart value is up to $1000, and a "luxury" segment for visitors who added more than $1000 to their shopping cart during a certain period of time during which the visitors have been tracked. The business user can selectively expose one or more segmentations to drive personalized search and content delivery to visitors based on the segment to which a specific visitor belongs.

The segmentation definition database 144 includes exposed segmentation definitions. The segmentation definitions can be activated or deactivated for product search personalization through a search management interface (e.g., GUI) accessible by a business user using business user device 170, and as input for the machine learning algorithm used by RBS module 158 to build product relevance scores stored in the product search index 150, discussed in greater detail below. While visitor behavior event data received through the event tracking module 152 may already be processed by the RBS module 158, the product relevance scores may only be used for product search personalization after sufficient initial training time of the machine learning algorithm of the RBS module 158.

The visitor identity module 148 performs visitor identification and enables tracking of identified visitors on business websites and applications. The visitor identity module 148 may provide an API to other modules to uniquely identify a visitor. The visitor identity module 148 may automatically attempt to identify a visitor upon loading a business website or application. Once a visitor is uniquely identified using the visitor identifier, the visitor identity may be used by the exposed segmentations module 154 to retrieve and expose the visitor segment(s) from, and by the event tracking module 152 for tracking the visitor behavior.

The product search index 150 stores an index of products stored in a product catalog that is a repository of all of the products or services that may be searched and/or purchased on the business e-commerce website or application. The product search index 150 may organize products in the product catalog based upon product relevance scores per visitor segment. Thus, upon receipt of a product search inquiry that includes customer segments, relevant search results of products in the product catalog will be returned based upon the product relevance scores. For example, for a visitor in a "luxury" segment, a search for shoes will return luxury brand shoes that have a higher product relevance score than non-luxury branded shoes.

The event tracking module 152 tracks visitor interaction with the business website or application and records visitor behavior event data from tracking such visitor interaction in the visitor database 140. The visitor behavior event data may be used to determine the customer segments to which the visitor belongs. The customer segments to which the visitor belongs are derived or calculated by applying segmentation rules to the visitor behavior event data. The customer segments may dynamically change in response to tracked changes in visitor behavior event data. In some embodiments, the visitor behavior event data may be received via an API.

The visitor behavior event data stored by the event tracking module 152 may update previous visitor profile data stored in the visitor database 140, which may result in 'segment switching' for specific exposed segmentation(s) for the identified visitor in the visitor session. Subsequent event tracking and product searches for that visitor will automatically include any updated segment parameters associated with the switched customer segments, resulting in immediate, 'real-time', personalized product search results for the visitor in the visitor session.

In some embodiments, the exposed segmentations module 154 may provide the exposed customer segments to which a visitor belongs to other modules, such as, via an API. The customer segments may be automatically exposed after each tracking event is recorded by the event tracking module 152 to retrieve possibly changed segment(s) to which the visitor belongs, triggered by the new event data recorded in the visitor database 140.

The product search module 156 may also provide an API to search for and retrieve specific products in response to a product search query input by an identified visitor. Such an API may be invoked from the business website or application, on behalf of an identified visitor, and will automatically have the exposed visitor segment(s) included as a search parameter. For example, a product query that includes "shoes" will also include the customer segments associated with the visitor identifier so that product search results may be based on or otherwise take into account any customer segments associated with the visitor identifier. Also, when an exposed segmentation is made 'active', the product search index 150 may use the visitor segment(s) associated with the visitor identifier to personalize the product search results, using product relevance scores stored in the product search index 150, as discussed in greater detail below.

In some embodiments, the relevance by segments (RBS) module 158 may process all visitor behavior event data of a plurality of identified visitors to build product relevance scores per segment across the plurality of identified visitors, and update the product relevance scores in the product search index 150. The RBS module 158 may automatically operate in the background to periodically (e.g., daily) update the product relevance scores. In some embodiments, the RBS module 158 may use a machine learning algorithm to build the product relevance scores. In some embodiments, the machine learning algorithm of the RBS module 158 uses exposed customer segments of multiple identified visitors to learn within the context of visitor actions of multiple visitors to build product relevance scores for each segment exposed across all visitors for a pre-defined period of time. Building the product relevance scores may require data training the machine learning algorithm with a sufficient amount of event data across multiple identified visitors. For example, the machine learning algorithm may learn from the visitor behavior event data of multiple identified visitors over a certain time period that there is a certain level of interest in a new product among the identified visitors and build a product relevance score for that product per exposed segment across the plurality of identified visitors. The product relevance scores determined by the RBS module may be used to 'boost' the relevance of specific products (or category thereof) in the product search index 150 for the exposed visitor segment(s). The product search index 150 may be updated with the product relevance scores per segment and may be used to personalize the product search results only for active segmentations. Thus, when an exposed segmentation is made active, the product search module 156 will use the visitor segment(s) associated with the identified visitor as a search parameter in a product search and use the product relevance scores in the product search index 150 to boost and personalize the search result for the identified visitor.

In operation, an identified visitor using a visitor user device 102 may use the web browser 120 and navigate to a business website site and begin a visitor session. The visitor session may be a new session or may be a continuation of a prior session. The visitor may start the session by authenticating themselves as a uniquely identified visitor to the business website, such as by inputting a user name and a password. As an alternative to viewing a business website using a browser, a visitor may open a dedicated business application having the same or similar functionality as the business website for searching and browsing products and services of the business. Upon beginning the visitor session, the visitor may be uniquely identified by the visitor identifier and the visitor profile stored in the visitor database 140. Also, upon beginning the visitor session, customer segments associated with the visitor identifier may be retrieved from the visitor database 140 for use in the visitor session. During the visitor session, the event tracking module 152 may track and record visitor behaviors and interactions as visitor behavior event data, which may result in a determination that the visitor has switched interest or behaviors and that the current customer segments associated with the visitor may no longer apply. The visitor events tracked by the event tracking module may update the visitor profile and data in the visitor database 140, which may cause the customer segments to change ("segment switching") for specific exposed segmentation(s) of the visitor. Also, over time, using event tracking data of multiple identified visitors, product relevance scores per segment across the multiple identified visitors may be determined using the RBS module 158. Thus, when an identified visitor searches for a product, the visitor's query will also include as a search parameter any exposed customer segments associated with the visitor's identity, which will return product search results based on the customer segments to which the visitor belongs. Moreover, certain products in the search results may be boosted based on the product relevance score per segment.

Figure 2:
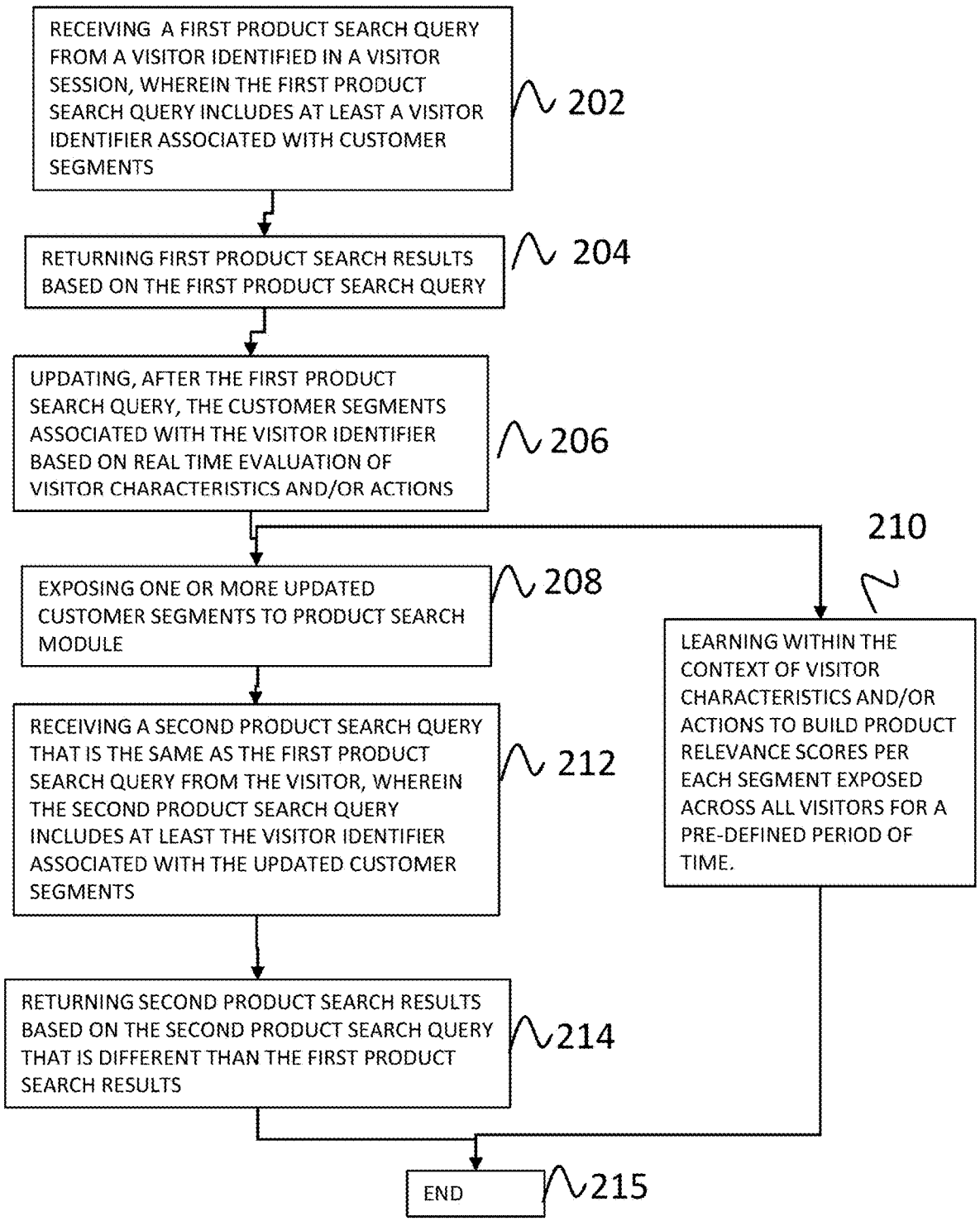
FIG. 2 depicts a flow diagram of an embodiment of a method for customer engagement, in accordance with the present principles.

FIG. 2 shows a method of customer engagement in accordance with embodiments of this disclosure. At 202, a first product search query is received from a visitor identified in a visitor session, such as at a business website or in a business application. The first product search query may include at least a visitor identifier associated with customer segments. The query may also include other search terms, such as terms related to products or services. For example, the visitor may be searching for shoes and may enter "shoes" into a search text box in a window of the web browser 120.

At 204, first product search results are returned based on the first product search query. The first product search results may be returned to the user device for review by the visitor. For example, the first product search results may be displayed in the web browser 120. Because the first product search query includes at least the visitor identifier, the first product search results are based on the customer segments associated with the visitor along with the input search terms (e.g., "shoes"). The first product search results, will thus be based on the segmentation of the visitor at the time of the first product search query. Thus, if the visitor belongs to a luxury brand segment, the first product search results will include products indexed as belonging to the luxury brand segment in the product search index 150. For example a $1,000 pair of Gucci® shoes may be included in the first product search results if the visitor is associated with the luxury brand segment at the time of the first product search query. However, a $1,000 pair of Gucci® shoes may not be included in the first product search results if the visitor is associated with a value brand segment at the time of the first product search query.

At 206, after the first product search query, the customer segments associated with the visitor identifier may be updated based on real time evaluation of visitor events. For example, as described above, customer segments may be switched dynamically and without perception by the visitor ("frictionless") as a result of applying the segmentation rules to tracked events (e.g., changes in visitor characteristics and/or actions). For example, after obtaining first product search results, a visitor may have clicked on one or more product listings of non-luxury branded shoes. Such clicking events may be tracked by the event tracking module 152 and recorded in the visitor database 140. The segmentation rules may be dynamically applied to any updated visitor event data, which may result in segment switching, e.g., from "luxury brand" to "value brand", based upon enforcing segmentation rules.

At 208, the updated customer segments (e.g., value brand) are exposed for use by the product search module 156 and also for use by the RBS module 158 in updating the product relevance scores in the product search index 150.

At 212, a second product search query, which is the same as the first product search query (e.g., for shoes), is received from the visitor. The second product search query includes at least the visitor identifier associated with the updated customer segments. For example, the first and second product search queries may include the terms "shoes" and the visitor identifier. At 214, second product search results, which are different from the first product search results, are returned based on the second product search query. The method 200 may end at 215.

Also, the method may include a process 210 performed in parallel with 208, 212, and 214, as well as and which may be performed periodically (e.g., daily) based upon searches of the visitor and other identified visitors. In some embodiments, at 210 the machine learning algorithm of the RBS module 158 uses exposed customer segments of the visitor at 208 and those of other identified visitors to learn within the context of visitor actions of multiple visitors to build product relevance scores for each segment exposed across all visitors for a pre-defined period of time. As discussed above, the RBS module 158 may 'boost' the relevance of specific products (or category thereof) in the product search index 150 for the exposed visitor segment(s), for example, when there is significant amount of similar visitor behavior across multiple visitors within the same segment(s). Thus, for example, if many identified visitors who belong to the luxury segment begin to click on a value branded product, then the product relevance score of that value branded product may be boosted in the product search index for the luxury segment.

The second product search results may be presented to the visitor in the order or product relevance score within the segment. For example, value branded shoes having a higher product relevance score corresponding to a 'value' segment may be presented in a list so that shoes with a higher product relevance score are presented at the top of the list and shoes with a lower product relevance score are presented at the bottom of the list. Thus, product search results can dynamically change in response to changes in user behavior and interests during the visitor session, which may lead to a more pleasant customer engagement experience for the visitor and higher conversion for the business.

Figure 3:
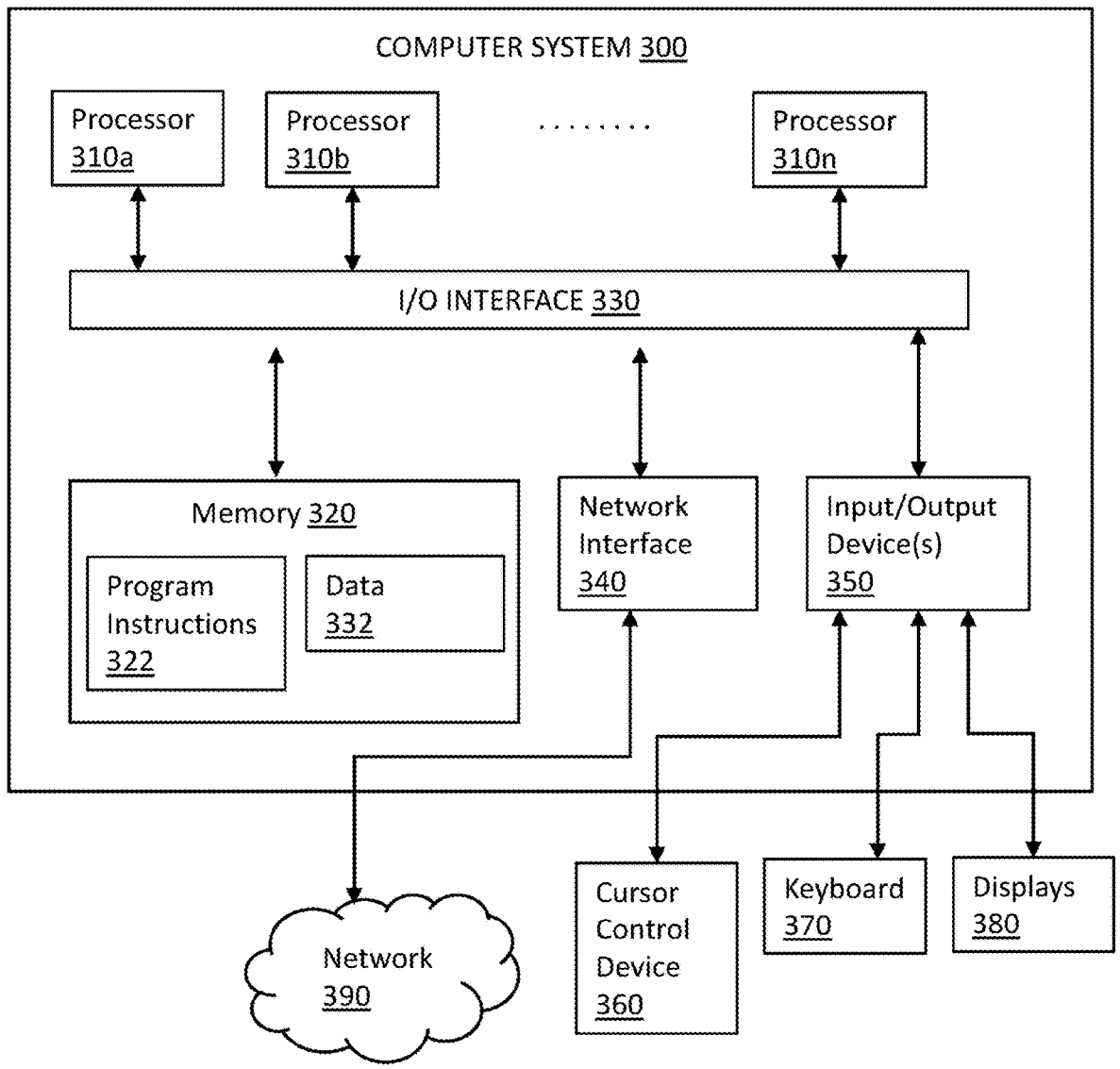
FIG. 3 depicts a high-level block diagram of a computing device suitable for use with embodiments for customer engagement in accordance with the present principles.

FIG. 3 depicts a computer system 300 that can be utilized in various embodiments of the invention to implement the computer and/or the display, according to one or more embodiments.

Various embodiments of method and system for customer engagement, as described herein, may be executed on one or more computer systems, which may interact with various other devices. One such computer system is computer system 300 illustrated by FIG. 3, which may in various embodiments implement any of the elements or functionality illustrated in FIGS. 1 and 2. In various embodiments, computer system 300 may be configured to implement methods described above. The computer system 300 may be used to implement any other system, device, element, functionality, or method of the above-described embodiments. In the illustrated embodiments, computer system 300 may be configured to implement the method 200 as processor-executable executable program instructions 322 (e.g., program instructions executable by processor(s) 310) in various embodiments.

In the illustrated embodiment, computer system 300 includes one or more processors 310a-310n coupled to a system memory 320 via an input/output (I/O) interface 330. Computer system 300 further includes a network interface 340 coupled to I/O interface 330, and one or more input/output devices 350, such as cursor control device 360, keyboard 370, and display(s) 380. In various embodiments, any of the components may be utilized by the system to receive user input described above. In various embodiments, a user interface may be generated and displayed on display 380. In some cases, it is contemplated that embodiments may be implemented using a single instance of computer system 300, while in other embodiments multiple such systems, or multiple nodes making up computer system 300, may be configured to host different portions or instances of various embodiments. For example, in one embodiment some elements may be implemented via one or more nodes of computer system 300 that are distinct from those nodes implementing other elements. In another example, multiple nodes may implement computer system 300 in a distributed manner.

In different embodiments, computer system 300 may be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 300 may be a uniprocessor system including one processor 310, or a multiprocessor system including several processors 310 (e.g., two, four, eight, or another suitable number). Processors 310 may be any suitable processor capable of executing instructions. For example, in various embodiments processors 310 may be general-purpose or embedded processors implementing any of a variety of instruction set architectures (ISAs). In multiprocessor systems, each of processors 310 may commonly, but not necessarily, implement the same ISA.

System memory 320 may be configured to store program instructions 322 and/or data 332 accessible by processor 310. In various embodiments, system memory 320 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 320. In other embodiments, program instructions and/or data may be received, sent or stored upon different types of computer-accessible media or on similar media separate from system memory 320 or computer system 300.

In one embodiment, I/O interface 330 may be configured to coordinate I/O traffic between processor 310, system memory 320, and any peripheral devices in the device, including network interface 340 or other peripheral interfaces, such as input/output devices 350. In some embodiments, I/O interface 330 may perform any necessary protocol, timing or other data transformations to convert data signals from one component (e.g., system memory 320) into a format suitable for use by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. Also, in some embodiments some or all of the functionality of I/O interface 330, such as an interface to system memory 320, may be incorporated directly into processor 310.

Network interface 340 may be configured to allow data to be exchanged between computer system 300 and other devices attached to a network (e.g., network 390), such as one or more external systems or between nodes of computer system 300. In various embodiments, network 390 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 340 may support communication via wired or wireless general data networks, such as any suitable type of Ethernet network, for example; via digital fiber communications networks; via storage area networks such as Fiber Channel SANs, or via any other suitable type of network and/or protocol.

Input/output devices 350 may, in some embodiments, include one or more display terminals, keyboards, keypads, touchpads, scanning devices, voice or optical recognition devices, or any other devices suitable for entering or accessing data by one or more computer systems 300. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

In some embodiments, the illustrated computer system 300 may implement any of the operations and methods described above, such as the methods illustrated by the flowcharts of FIG. 2. In other embodiments, different elements and data may be included.

Those skilled in the art will appreciate that computer system 300 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 300 may be transmitted to computer system 300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

Figure 4:
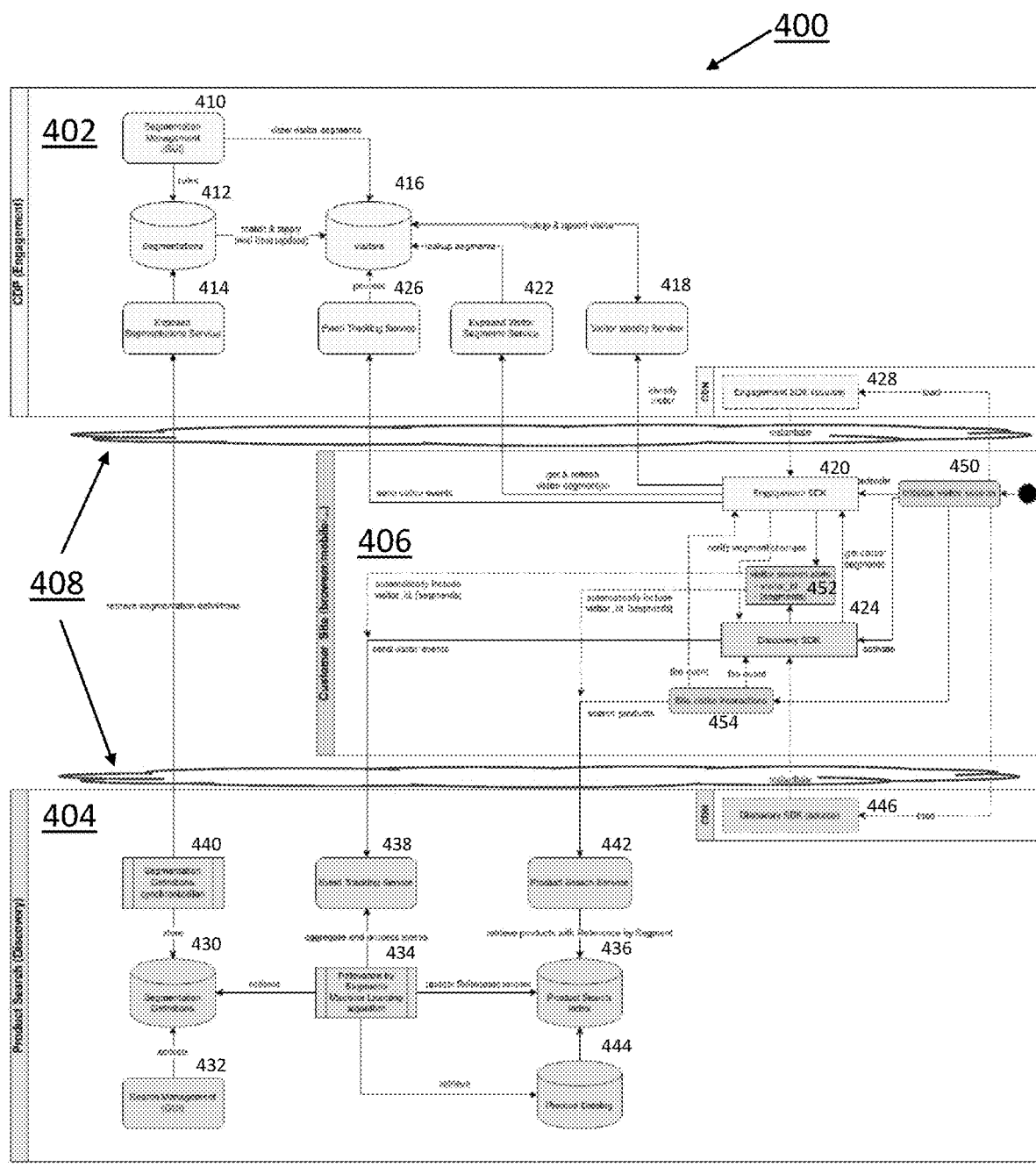
FIG. 4 depicts a block diagram of another embodiment of a network architecture of a system for customer engagement in accordance with the present principles.

FIG. 4 depicts a block diagram of another embodiment of a network architecture of a system 400 for customer engagement in accordance with the present principles. System 400 includes the functionality described above with respect to system 100. However, some of the functionality of the modules described with respect to system 100 may be distributed among multiple devices: an engagement device 402; a product search device 404; and a visitor device 406, which are communicatively coupled by a communication network 408, such as the Internet.

Engagement Device 402

The engagement device 402 may include a segmentation management interface 410 (a graphical user interface) to define and manage customer segmentation definitions and rules. For example, a segmentation named "cart value" can split visitors in two groups: a "budget" segment for visitors who's aggregated shopping cart value is up to $1000, and a "luxury" segment for visitors who added more than $1000 to their shopping cart during the entire lifetime they have been tracked so far. The engagement device 402 may include a segmentations storage 412 (i.e., a database) to store the segmentation definition rules. The segmentations storage 412 may be the segmentation database 142.

The business user, through the segmentation management interface 410 and an exposed segmentation service 414, can expose selected segmentations stored in the segmentations storage 412 to make them available to the product search device 404 to drive personalized search and content delivery to the visitor device 406 based on the segment(s) to which a specific visitor belongs. In some embodiments, the exposed segmentation service 414 provides a secure API to the product search device 404 to retrieve and synchronize the exposed segmentation definitions. In some embodiments, the exposed segmentations service 414 is an automated service-to-service backend integration.

The engagement device 402 may include a visitor storage 416 (e.g., database) that stores characteristics and collected data and events for all uniquely identified visitors (e.g., customers), as well as the dynamically derived segment for each defined segmentation to which the visitors belong. The visitor storage 416 may be the same as the visitor database 140. Each uniquely identified visitor may be identified by a unique visitor identifier. Every change to or newly collected data and events for a visitor can immediately result in a change to which segment(s) the visitor belongs (segment switching) through dynamic re-evaluation of the segmentation rules.

The engagement device 402 may include a visitor identity service 418 to identify and enable tracking of visitors on customer sites and applications of the business user. The visitor identify service 418 may be a service of the visitor identify module 148. In some embodiments, the visitor identity service 418 provides a public API to uniquely identify a visitor. Such an API may be automatically invoked by an Engagement SDK 420 of the visitor device 406 when the Engagement SDK 420 is loaded and activated on an e-commerce website or application visited by the visitor. Once a visitor is identified, the visitor identity service 418 may provide the unique visitor identifier associated with the visitor to the visitor device 406 for loading into a visitor session state 452. The visitor identifier can thereafter be used for retrieving the exposed visitor segment(s) in the visitor storage 416 and for tracking and storing the visitor behavior in the visitor storage 416. The exposed visitor (i.e., customer) segments can also be loaded into the visitor session state 452 through the Engagement SDK 420.

The engagement device 402 also may include an exposed visitor segments service 422 that provides the exposed segment(s) a visitor belongs to via an API. The exposed visitor segments service 422 may be a service of the exposed segmentations module 154. Such API is automatically invoked via the Engagement SDK when the e-commerce website or application visited by the visitor is also integrated with the product search device 404, via a Discovery SDK 424. Furthermore, such API is (then) also automatically invoked after each tracking event sent by the Engagement SDK 420, to retrieve possibly changed segment(s) the visitor belongs to, triggered by the new event data recorded in the visitor storage 416.

The engagement device 402 also includes an event tracking service 426 that processes visitor behavior event data received via an API and stores these into the visitor storage 416. The event tracking service 426 may be a service of event tracking module 152.

The engagement device 402 also includes an engagement SDK (source) 428. In some embodiments, the engagement SDK (source) 428 is a JavaScript library served as a static resource to be loaded and activated on an e-commerce website or application visited by the visitor. In some embodiments, the engagement SDK (source) 428 provides an abstraction and automation layer to interact with the visitor identity service 418 and the event tracking service 426.

Product Search Device 404

The product search device 404 includes segmentation definition storage 430, which may be a database of segmentation definitions exposed by the exposed segmentations service 414. The segmentation definition storage 430 may be the segmentation definition database 144. The product search device 404 may include a segmentation definitions synchronization service 440. In some embodiments, the segmentation definitions synchronization service 440 is an automated background service which may retrieve and synchronize the segmentations from the exposed segmentations service 414 via a secured API, and stores and updates their definitions in the segmentation definitions storage 430.

As discussed in greater detail below, the segmentation definitions stored in the segmentation definition storage 430 may be activated or deactivated for product search personalization through a search management interface (e.g., a GUI) 432 of the product search device 404. The segmentation definitions may be used as input to a relevance by segments (RBS) machine learning algorithm 434 to build the product relevance scores stored in a product search index 436, which may be the same as product search index 150. The RBS machine learning algorithm may be the same algorithm described above and used by the RBS module 158.

Visitor segment(s) data may be received through an event tracking service 438 of the product search device 404. The event tracking service 438 may be a service of the event tracking module 152. Such received visitor segment data may be processed by the RBS machine learning machine 434 only after sufficient initial training time of the RBS machine learning algorithm 434. Thus, the RBS machine learning algorithm 434 cannot be used to generate the product relevance scores until the relevance by segments machine learning algorithm 434 is trained.

The event tracking service 438 logs visitor behavior event data received via an API. In some embodiments, such an API is invoked through the Discovery SDK 424 integrated in the e-commerce website or application visited by the visitor. When the e-commerce website or application also integrates the Engagement SDK 420, the visitor event data sent through the Discovery SDK 424 will automatically include the exposed visitor segment(s) from the visitor storage 416 as shown in FIG. 4.

As noted above, the product search device 404 includes an RBS machine learning algorithm which is an automated background process which processes all visitor event data logs with their embedded visitor segment(s) to build product relevance scores per segment across all visitors, and updates these in the product index. Building the relevance scores requires data training of the RBS machine learning algorithm using sufficient event data across multiple visitors. Only for active segmentations (as activated from the search management interface 432) the product search index 436 will be updated with the relevance scores per segment and can be used to personalize the product search results.

Also, as noted above, the product search device 404 includes a search management interface 432 which can be used by a user of the product search device 404 to manage the exposed segmentations stored in segmentation definition storage 430 for product search activation or deactivation. A segmentation may be deactivated if the RBS machine learning algorithm 434 is not trained. After an initial training period, when sufficient visitor event data has been collected, an exposed segmentation in segmentation definition storage 430 can be activated by the user of the product search device 404 via the search management interface 432. Such activation will trigger the RBS machine learning algorithm 434 to update the relevance scores per segment in the product search index 436, and a product search service 442 will then personalize search results based on the visitor (i.e., customer) segments provided on the search request. The product search index 436 may be the same as the product search index 150.

The product search service 442 provides one or more API to search for and retrieve specific products in a product catalog 444 in response to a product search query from visitor device 406. The product search service 442 may be a service of the product search module 156. Such API(s) is(are) invoked from the e-commerce website or application visited by the visitor, on behalf of an identified visitor, and will automatically have the exposed visitor segment(s) included as a search parameter along with the actual product search terms input by the visitor (i.e., "shoes" for a search for shoes). When an exposed segmentation is made 'active' by the search management interface 432, the product search service 442 will use the visitor segment belonging to an active segmentation to 'boost' and personalize the search result, using the product relevance scores of the product search index 436.

The product search device 404 includes a Discovery SDK (source) 446. In some embodiments, the Discovery SDK (source) 446 is a JavaScript library served as a static resource to be loaded and activated on a customer site or application of the business user. In some embodiments, the Discovery SDK (source) 446 provides an abstraction and automation layer to interact with the likewise loaded and activated Engagement SDK to retrieve the current exposed visitor segments, to be automatically passed on to the event tracking service 438 and the product search service 442 calls.

Visitor Device 406

The visitor device 406 may include a visitor session initialization module 450 that automatically initializes a unique visitor session by loading and activating both the Engagement SDK 420 and Discovery SDK 424. When the Engagement SDK 420 is started, it will uniquely identify the current visitor via the visitor identity service 418. The Engagement SDK 420 also can (re)connect an identified visitor from earlier visitor sessions and/or across multiple websites. The unique visitor identifier will be kept within a visitor session state 452 and used for subsequent service API calls of the Engagement device 402.

When the Discovery SDK 424 is started, it will detect the usage of the Engagement SDK 420, and request the Engagement SDK 420 to retrieve the current visitor segment(s) from the visitor storage 416 using the exposed visitor segments service 422. The exposed and retrieved visitor segment(s) will be kept within the visitor session state 452, and automatically passed on as parameter to subsequent API calls of the event tracking service 438 and product search service 442.

The Discovery SDK 424 also will register a callback listener with the Engagement SDK 420 to be notified whenever the visitor's segment(s) are updated, so that visitor segment switching will automatically be reflected in subsequent API calls to the event tracking service 438 and product search service 442.

The e-commerce site or application opened on visitor device 406 may include functionalities for site visitor interactions 454 to trigger invoking event tracking services 426 and 438. Once the Engagement SDK 420 and the Discovery SDK 424 are activated and the visitor session initialization has been completed, subsequent website or application logic will commence. Based on the implementation of the e-commerce website or application, specific visitor interactions with the website or application may fire or otherwise send visitor events through either or both the Engagement SDK 420 and the Discovery SDK 424. Such visitor events will result in invoking either or both of the event tracking services 426 and 438.

The visitor events sent to the event tracking service 438 will include the current visitor segments, which will be used to train the RBS machine learning algorithm 434 to improve the product relevance scores by segment for the product search index 436.

The visitor events sent to the event tracking service 426 will update the visitor profile and data in visitor storage 416, which may result in segment switching for specific exposed segmentation(s) of that visitor as a result of dynamically reapplying or otherwise enforcing the segmentation rules to visitor data. The Engagement SDK 420 will retrieve such updated segment(s) for the visitor automatically, and notify the Discovery SDK 424 of such changes. Subsequent API service calls of the event tracking service 438 and product search service 442 will include these updated segment(s) parameters automatically, resulting in immediate real-time further personalized and optimized results, based on the visitor interactions, within the same session.

In some embodiments, the visitor device 406 may be the visitor user device 102, and the engagement SDK 420, Discovery SDK 424, visitor session initialization module 450, visitor session state 452, and site visitor interactions 454 may be stored in memory 116 of the visitor user device 102.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

Various elements, devices, modules and circuits are described above in association with their respective functions. These elements, devices, modules and circuits are considered means for performing their respective functions as described herein. While the foregoing is directed to embodiments of the present invention, other and further embodiments of the invention may be devised without departing from the basic scope thereof, and the scope thereof is determined by the claims that follow.

The invention claimed is:

1. A customer engagement method comprising:
   receiving a first product search query from a visitor identified in a visitor session, wherein the first product search query includes at least customer segments associated with a visitor identifier of the visitor;
   conducting a first product search using the first product search query to generate first product search results;
   returning the first product search results based on the first product search query, wherein first product search results include a first listing of products;
   displaying the first product search results in a web browser of the visitor;
   updating, after the first product search query, the customer segments associated with the visitor identifier based on real time evaluation of visitor characteristics and/or actions, wherein the updated customer segments are exposed to product searching in response to tracked changes in at least one of visitor characteristics or actions;
   generating product relevance scores per each customer segment exposed across a plurality of different visitors for a pre-defined period of time using a trained machine learning algorithm;
   receiving a second product search query from the visitor, wherein the second product search query includes at least the updated customer segments associated with the visitor identifier;

conducting a second product search using the second product search query to generate second product search results;

returning, based at least on the second product search query and the product relevance scores generated by the trained machine learning algorithm, the second product search results, wherein second product search results include a second listing of products; and displaying the second product search results in the web browser.

2. The method of claim 1, wherein the product relevance score ranks relevance of products in a customer segment and wherein the second product search results are based on the relevance score of the customer segments associated with the visitor identifier.

3. The method of claim 2, wherein when the updated customer segments are exposed to product search, the customer segments and the product relevance scores are used to personalize the second product search results for the identified user.

4. The method of claim 1, further comprising tracking at least one of visitor characteristics or visitor actions based on the visitor identifier.

5. The method of claim 3, wherein the at least one of visitor characteristics or visitor actions are tracked on a web site or in an application.

6. A system for customer engagement comprising:

a processor configured to:

receive a first product search query from a visitor identified in a visitor session, wherein the first product search query includes at least customer segments associated with a visitor identifier of the visitor;

conduct a first product search using the first product search query to generate first product search results;

return the first product search results based on the first product search query, wherein first product search results include a first listing of products;

display the first product search results in a web browser of the visitor;

update, after the first product search query, the customer segments associated with the visitor identifier based on real time evaluation of visitor characteristics and/or actions, wherein the updated customer segments are exposed to product searching in response to tracked changes in at least one of visitor characteristics or actions;

generate product relevance scores per each customer segment exposed across a plurality of different visitors for a pre-defined period of time using a trained machine learning algorithm;

receive a second product search query from the visitor, wherein the second product search query includes at least the updated customer segments associated with the visitor identifier;

conduct a second product search using the second product search query to generate second product search results;

return, based on the second product search query and the product relevance scores generated by the trained machine learning algorithm, second product search results, wherein second product search results include a second listing of products; and displaying the second product search results in the web browser.

7. The system of claim 6, wherein the relevance score ranks relevance of products in a customer segment and wherein the second product search results are based on the relevance score of the customer segments associated with the visitor identifier.

8. The system of claim 6, further comprising tracking at least one of visitor characteristics or visitor actions based on the visitor identifier.

9. The system of claim 8, wherein the at least one of visitor characteristics or visitor actions are tracked on a web site or in an application.

10. A non-transitory computer readable medium, storing thereon computer readable instructions that when read by a computer cause a processor to perform a customer engagement method comprising:

receiving a first product search query from a visitor identified in a visitor session, wherein the first product search query includes at least customer segments associated with a visitor identifier of the visitor;

conducting a first product search using the first product search query to generate first product search results;

returning the first product search results based on the first product search query, wherein first product search results include a first listing of products;

displaying the first product search results in a web browser of the visitor;

updating, after the first product search query, the customer segments associated with the visitor identifier based on real time evaluation of visitor characteristics and/or actions, wherein the updated customer segments are exposed to product searching in response to tracked changes in at least one of visitor characteristics or actions;

generating product relevance scores per each customer segment exposed across a plurality of different visitors for a pre-defined period of time using a trained machine learning algorithm;

receiving a second product search query from the visitor, wherein the second product search query includes at least the updated customer segments associated with the visitor identifier;

conducting a second product search using the second product search query to generate second product search results;

returning, based at least on the second product search query and the product relevance scores generated by the trained machine learning algorithm, the second product search results wherein second product search results include a second listing of products; and displaying the second product search results in the web browser.

11. The method of claim 10, wherein the relevance score ranks relevance of products in a customer segment and wherein the second product search results are based on the relevance score of the customer segments associated with the visitor identifier.

12. The method of claim 10, wherein when the updated customer segments are exposed to product search, the customer segments and the product relevance scores are used to personalize the second product search results for the identified user.

13. The method of claim 10, further comprising tracking at least one of visitor characteristics or visitor actions based on the visitor identifier.

14. The method of claim 13, wherein the at least one of visitor characteristics or visitor actions are tracked on a web site or in an application.

\* \* \* \* \*